(12) United States Patent
Blume

(10) Patent No.: US 11,704,009 B2
(45) Date of Patent: Jul. 18, 2023

(54) VIDEO CONFERENCE VIRTUAL WHITEBOARD

(71) Applicant: Google LLC, Mountain View, CA (US)

(72) Inventor: Arthur Edmond Blume, Beverly, MA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/502,175

(22) Filed: Oct. 15, 2021

(65) Prior Publication Data

US 2023/0122345 A1 Apr. 20, 2023

(51) Int. Cl.
*G06F 3/04842* (2022.01)

(52) U.S. Cl.
CPC ................................ *G06F 3/04842* (2013.01)

(58) Field of Classification Search
CPC ............................. G06F 3/04842; G06F 3/041
See application file for complete search history.

(56) References Cited

U.S. PATENT DOCUMENTS

| | | | | |
|---|---|---|---|---|
| 7,770,116 B2* | 8/2010 | Zhang | ........... | G11B 27/105 715/765 |
| 8,635,531 B2* | 1/2014 | Graham | ........... | G06F 16/70 715/716 |
| 9,207,833 B2 | 12/2015 | Doray | | |
| 2014/0165152 A1 | 6/2014 | Farouki | | |
| 2015/0106699 A1 | 4/2015 | Somasundaram et al. | | |
| 2015/0169069 A1* | 6/2015 | Lo | ........... | G06F 3/005 715/753 |
| 2016/0072862 A1* | 3/2016 | Bader-Natal | ........... | H04N 7/15 715/755 |
| 2018/0129363 A1 | 5/2018 | Axelsson et al. | | |
| 2020/0387871 A1 | 12/2020 | Adibowo | | |

OTHER PUBLICATIONS

Aircopy, "Transfer Files Between Phone and PC", https://www.aircopy.com, retrieved on Jun. 8, 2021, 7 pages.
Miro, "Where telecommuting teams get work done", https://miro.com, retrieved on Jun. 8, 2021, 71 pages.
Nopanen, "How to use Whiteboard in Teams meetings", https://mymetaverseday.com/2019/11/19/how-to-use-whiteboard-in-teams-meetings/, retrieved on Jun. 8, 2021, 29 pages.
International Search Report and Written Opinion for Application No. PCT/US2022/045538, dated Feb. 3, 2023, 14 pages.
Widjaja et al., "Discusys: Multiple User Real-time Digital Sticky-Note Affinity-Diagram Brainstorming System", Procedia Computer Science, vol. 22, 2013, pp. 113-122.

* cited by examiner

*Primary Examiner* — Cao H Nguyen
(74) *Attorney, Agent, or Firm* — Dority & Manning, P.A.

(57) ABSTRACT

A computing system and method that can be used for a video conferencing system including a graphical user interface having a virtual whiteboard user interface that is responsive to inputs from multiple attendees of a video conference. In particular, the state of an application tool such as a camera, visual note indicator, web link, pen/pencil tool, highlighter tool, or other application tool executing or otherwise represented within the multi-user interaction whiteboard can respond and change in real-time as multiple attendees of the video conference interact with the virtual whiteboard user interface. The systems and methods of the present disclosure allow for a multi-user interaction whiteboard to offer various tools for the video conferencing system to facilitate interactions by multiple attendees within the graphical user interface.

17 Claims, 7 Drawing Sheets

VIDEO CONFERENCE VIRTUAL WHITEBOARD

FIELD

The present disclosure relates generally to multi-attendee video conferencing systems. More particularly, the present disclosure relates to improved features relating to a virtual whiteboard within a video conference.

BACKGROUND

Multi-attendee video conferencing techniques can provide video streams to a client device for multiple attendees of a video conference. As an example, a speaking attendee may be displayed in a first display region while non-speaking attendees may be displayed in other display regions. Some video conferencing techniques permit content sharing between attendees during a video conference. For example, some systems may permit an attendee to share all or a portion of their display with other attendees who may view the content currently rendered on the display. While current video conferencing techniques may enable attendees to share content, there remains a need for techniques to further collaboration and interaction between multiple attendees of a video conference.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for organizing visual note indicators associated with an affinity classification within a virtual whiteboard user interface. The method comprises causing a virtual whiteboard to be displayed within a graphical user interface of a first client device for execution of a multi-user interaction whiteboard within a graphical user interface of a video conferencing system wherein a respective display of content within the multi-user interaction whiteboard provides a consistent view for each user of the multi-user interaction whiteboard. The method comprises receiving user input provided to the virtual whiteboard indicating user request for a first visual note execution. The method comprises generating a first visual note indicator, wherein the first visual note indicator comprises visual note content based at least in part on user input. The method comprises receiving context menu user input, wherein the context menu user input comprises affinity classification data associated with the first visual note indicator. The method comprises mapping the first visual note indicator to one of a number of affinity classification rendezvous points based at least in part on the context menu user input. The method comprises providing data for rendering the virtual whiteboard within the graphical user interface, the data including note data associated with the visual note content and context menu data associated with the affinity classification data.

Other aspects of the present disclosure are directed to various methods, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
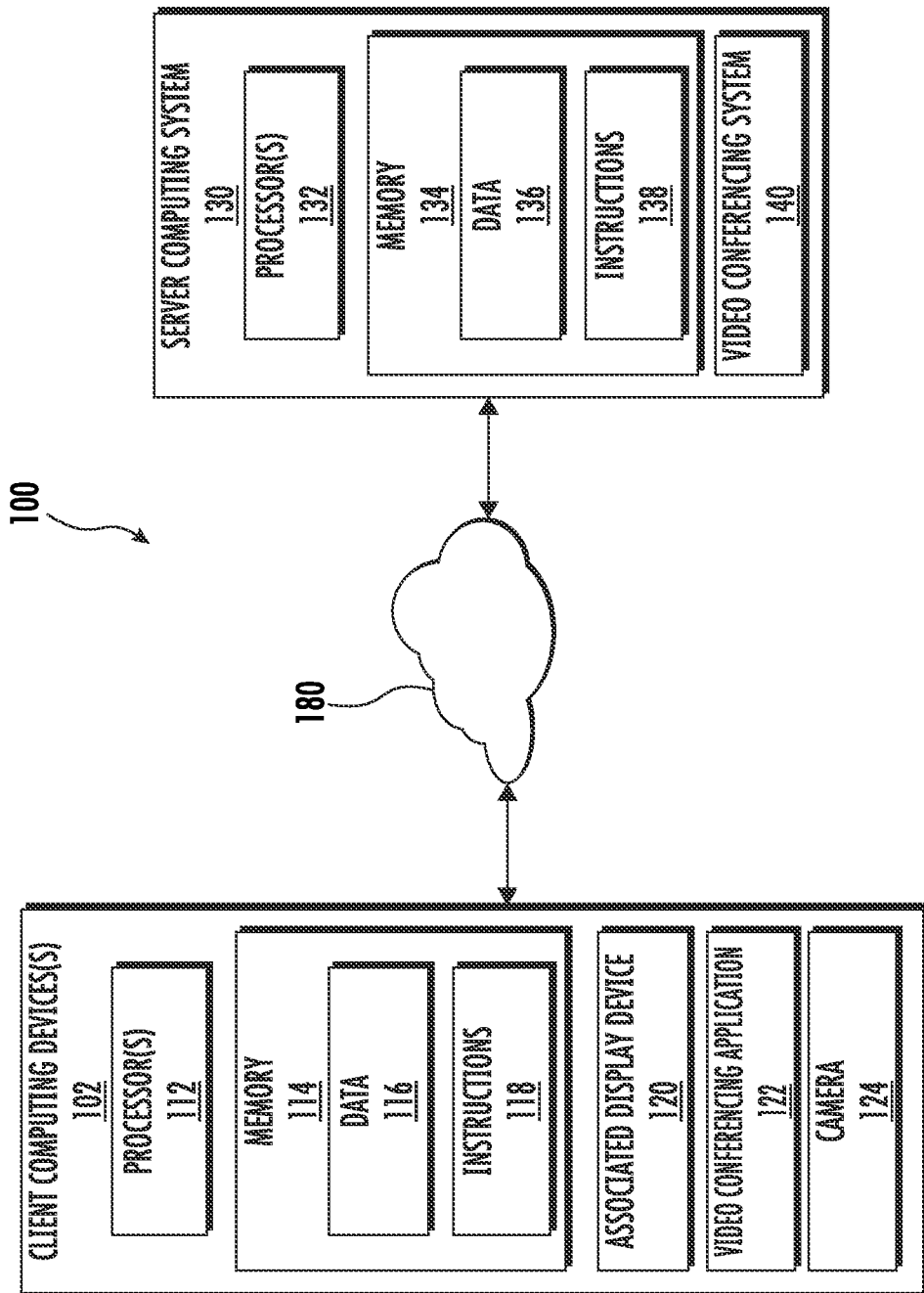
FIG. 1 depicts a block diagram of example computing systems according to example embodiments of the present disclosure.

Reference numerals that are repeated across plural figures are intended to identify the same features in various implementations.

DETAILED DESCRIPTION

Overview

Generally, the present disclosure is directed to a video conferencing system including a graphical user interface having a virtual whiteboard user interface that is responsive to inputs from multiple attendees of a video conference. The state of an application tool such as a camera, visual note indicator, web link, pen/pencil tool, highlighter tool, or other application tool executing or otherwise represented within the multi-user interaction whiteboard can respond and change in real-time as multiple attendees of the video conference interact with the virtual whiteboard user interface. The multi-user interaction whiteboard can offer various tools for the video conferencing system to facilitate interactions by multiple attendees within the graphical user interface.

Example aspects of the present disclosure provide a more collaborative and streamlined approach to conducting remote meetings. For example, a multi-user interaction whiteboard can be displayed to one or more members of a remote meeting wherein the one or more members of the remote meeting can interact with the whiteboard by leveraging one or more tools present in the multi-user interaction whiteboard (e.g., a camera, visual note indicator, web link, pen/pencil, highlighter, etc.). In one example, a first and second user can indicate to the multi-user interaction whiteboard to execute a number of visual note indicators.

Aspects of the present disclosure enable various interactions to be shared collaboratively between multiple attendees of a video conference, including the ability to jointly interact with shared content. Traditionally, video conferencing applications permit only limited shared experiences, such as permitting a selected user to share content but not allowing additional users to interact with the shared content. By contrast, embodiments of the present disclosure provide shared applications within an interaction whiteboard that reacts in real-time to multiple user inputs. Additionally, embodiments of the present disclosure enable various tools to be executed within an interaction whiteboard. In this manner, an attendee may select from among various available tools such as camera, visual note indicator, web link, pen/pencil, highlighter, etc. that can be executed in a multi-user interaction whiteboard to enable multiple attendees to interact with the application. The video conferencing system can further provide the ability for an attendee to control interaction through user and display settings that define permissions and parameters for interaction with a multi-user interaction whiteboard by other attendees of the video conference.

In some implementations, a user can organize visual note indicators associated with an affinity classification within a virtual whiteboard user interface. In particular, a virtual whiteboard can be displayed within a graphical user interface of a first client device for execution of a multi-user interaction whiteboard within a graphical user interface of a video conferencing system. Even more particularly, a respective display of content within the multi-user interaction whiteboard provides a consistent view for each user of the multi-user interaction whiteboard.

In some implementations, the computing system can receive user input to the virtual whiteboard indicating a user request for a visual note execution. In particular, a user can initiate a visual note indicator by a number of methods. For example, a user can initiate a visual note indicator by clicking or double clicking on the virtual whiteboard user interface. In particular, clicking or double clicking on the virtual whiteboard user interface can launch a tool for initiating a visual note indicator. As another example, a user can initiate a visual note indicator by leveraging a tool bar overlaid on the virtual whiteboard user interface. For instance, the tool bar can have a tool for initiating a visual note indicator. In particular, the tool for initiating a visual note indicator can allow content to be entered (e.g., typed, handwritten, uploaded, etc.). Furthermore, the visual note indicator can comprise content based at least in part on the user input.

In some implementations, a user can leverage a camera to enter content for a visual note indicator. In particular, a camera can be accessed directly from the virtual whiteboard user interface such that a picture can be taken (e.g., of notes, drawings, items, etc.) and uploaded to the virtual whiteboard user interface. Even more particularly, a machine-readable symbol such as a quick-response (QR) code, barcode, or other visual encodings, can be leveraged to upload images. For instance, a user can access a QR code associated with the virtual whiteboard user interface such that a user can leverage an external device containing a camera (e.g., smartphone, tablet, laptop, etc.) to upload an image to the whiteboard user interface. Even more particularly, the QR code access point can facilitate adding content without needing to supply login credentials, such that any device that scans the QR code can upload an image to the virtual whiteboard user interface.

In one example, the image content captured and provided to the whiteboard can include images of paper or content written or printed on paper. In other examples, the content added to the whiteboard can include existing digital imagery. Thus, via the webcam/QR code popup or similar, example aspects of the present disclosure make it incredibly easy to snap and upload photos of paper or other content. This is usually a very cumbersome process involving extracting photos from a photo storage service or emailing them to yourself. The example system provided herein reduces this process to a fairly straightforward step. Moreover, as some implementations of the QR-code access point do not require login: the user can use it from any phone or tablet, and it will send the uploaded image off to rendezvous with the wall that provided the QR code.

In some implementations, the computing system can receive context menu input, wherein the context menu can be initiated by user interaction with the virtual whiteboard user interface. For example, a user can right click on the virtual whiteboard user interface to initiate the context menu. In particular, upon initiating the context menu, the context menu can comprise one or more selectable options. Even more particularly, the selectable inputs can include affinity classifications. For example, a previously input affinity classification (e.g., via the tool bar, via a previous context menu, etc.) can be a selectable option on the initiated context menu. As another example, an affinity classification input tool can be a selectable option on the initiated context menu, wherein a user can enter a new affinity classification to initiate a new affinity classification.

In some implementations, the computing system can map a visual note indicator to one of a number of affinity classification rendezvous points based at least in part on the context menu user input. In particular, the computing system can associate a visual note indicator with an affinity classification based at least in part on the proximity of the context menu to the visual note indicator. Even more particularly, the computing system can associate a particular affinity classification with an affinity classification rendezvous point located within the virtual whiteboard user interface. In some implementations, the computing system can move the visual note indicator to the affinity classification rendezvous point associated with the particular affinity classification.

In some implementations, the computing system can provide data for rendering the virtual whiteboard within the graphical user interface. In particular, the data can include note data associated with the note content. Even more particularly, the data can include context menu data associated with the affinity classification data.

In some implementations, the computing system can associate the virtual whiteboard with a primary user. For example, the primary user can be the first user to initiate the multi-user interaction whiteboard (e.g., in a video conference). As another example, the primary user can be the user who organized the video conference (e.g., the user who sent calendar invites) leveraging the video conferencing system. In particular, the computing system can receive data associated with one or more inputs from the primary user indicating permissions for a secondary user with respect to the multi-user interaction whiteboard. Even more particularly, the permissions of the secondary user can be fewer than the permissions of the primary user. For example, the primary user can select what permissions to give to secondary users. As another example, the primary user can associate secondary users with tiers of permission (e.g., contributor, editor, viewer, etc.). As yet another example, the primary user can transfer the position of primary user to another user (e.g., a secondary user).

In yet further implementations, the whiteboard is not be specifically associated with any one user, but instead can be associated only with a recording or file of the video conference. In one example, the whiteboard content can automatically be saved to a file storage service (e.g., Google Drive). The whiteboard content can be saved to a folder associated with the video conference, a corresponding meeting invitation or instance, and/or other locations. In some implementations, permission to the whiteboard content can be automatically granted to accounts associated with any of the video conference participants.

In some implementations, the computing system can generate a multi-user interaction whiteboard separately from a private user whiteboard. In particular, the private user whiteboard can be inaccessible to any users other than the associated primary user. For example, a user can initiate content to the private user whiteboard and move content (e.g., copy and paste) from the private user whiteboard to the multi-user interaction whiteboard. Even more particularly, the multi-user interaction whiteboard can be generated automatically upon initialization of a video conference leveraging the video conferencing system. For example, a multi-user interaction whiteboard is always available for initiation in a video conference as opposed to a user needing to input indications to the computing system to generate one. Alternatively, a user can generate yet another whiteboard interface and specify whether the generated whiteboard interface is public, private, or selectively accessible.

In some implementations, the computing system can initiate the multi-user whiteboard as translucently overlaying on top of a user screen sharing presentation. In particular, the multi-user whiteboard can be translucently overlayed on top of the user screen sharing presentation such that the one or more video conference attendees can see content a user is sharing (e.g., a slideshow, web browser, document, etc.) underneath the multi-user whiteboard (e.g., in real time). In some implementations, a level of translucency of the whiteboard can be controlled by one or more of the users to become more or less translucent.

In some implementations, the user can export the multi-user white board application interface to a slide deck. In particular, the multi-user white board application interface can comprise single slides-sized rectangles in the graphical user interface. Even more particularly, the virtual whiteboard can be converted to a presentation including slides comprising content grouped by the single slides-sized rectangles in the interface. For example, the slide deck can use grid lines contained in the multi-user white board application to guide what content is contained in the same slide. As another example, the grid lines can indicate the order of presentation of a slide deck (e.g., top to bottom, left to right). As yet another example, the order of presentation in a slide deck based on the grid lines can change. In particular, a user can change settings to change the order of presentation in a slide deck. Even more particularly, the order of presentation in a slide deck can change automatically based on the country the video conference participants are located in (e.g., in some countries the slide deck can be exported from grid lines in an order of top to bottom, right to left). Furthermore, content that is placed on the multi-user white board application interface can automatically align with the grid lines (e.g., the content can snap to align with the grid). In particular, content can align with the grid lines when a user indicates a desire for content to align (e.g., a user holds down shift). Even more particularly, depending on the zoom level of the user, content can align with sub grid lines or main grid lines.

In some implementations, some but not all of the content can be exported to a slide deck. In particular, a user can select content that can be exported to a slide deck. For example, a user can click on content to export to a slide deck. As another example, a user can hold a key down and, in some cases, drag in combination to highlight the content to export to a slide deck.

In some implementations, the interaction display can be associated with the particular video conference such that a user can access the annotated interaction display by entering the associated video conference (e.g., by associated URL, calendar invite, etc.). In particular, the user can access the annotated interaction display after the video conference is over by leveraging the formerly used video conference entry points. In some implementations, the interaction display can be associated with a user's cloud drive such that the user can access the annotated interaction display by initiating the annotated interaction display from the user's cloud drive.

In some implementations, one or more appscripts can be used to generate add-ons and/or to effectuate some or all of the features described herein. For example, an appscript can be used to write code to directly generate visual note indicators and/or to sort the visual note indicators to different rendezvous points.

Thus, the present disclosure provides a computing system and method that can be used to videoconference. In particular, the computing system can be used to provide systems and methods for a virtual whiteboard user interface that is responsive to inputs from multiple attendees of a video conference. More particularly, example aspects of the present disclosure involve computing systems and computer-implemented methods for facilitating collaboration of video conference participants in remote locations through real-time interaction with the whiteboard tools wherein the whiteboard tools can interact with the whiteboard user interface.

The systems and methods of the present disclosure provide a number of technical effects and benefits. As one example technical effect, the proposed techniques are able to provide users with an immersive and helpful experience during a virtual workday in a virtual workspace. In particular, the video conferencing system enables attendees to not only view content shared by other attendees, but to interact with the content in a collaborative manner. Additionally, this enables multi-user interaction within the video conferencing system, rather than each user and client individually interacting with content that is not responsive to other attendee inputs. In accordance with example embodiments, a multi-user interaction whiteboard is capable of executing code for various tools such as camera, visual note indicator, web link, pen/pencil, highlighter, and the like. The code is responsive to inputs from the individual client devices, enabling state changes in real-time as different attendees interact with the interaction whiteboard. The application code can be centrally managed and/or distributed to one or more client devices. With an interaction whiteboard architecture, the video conferencing system enables predetermined code as well as user-defined code to be executed in the multi-user interaction whiteboard. In this manner, computing efficiencies including reduced bandwidth, reduced processor usage, reduced memory usage, etc. can be provided for a multi-user interaction whiteboard. Thus, systems and methods provided herein can facilitate a user to more quickly navigate to a single whiteboard rather than many different whiteboards, which represents an improvement in the functioning of computers.

Furthermore, the present disclosure opens the door to a virtual workplace as opposed to merely virtually working. In particular, the virtual workplace can replicate many desirable attributes of working in person while cutting down on the undesirable attributes. By leveraging the proposed techniques in a virtual workplace, users can more seamlessly communicate with others in a similar fashion as when working in person, thus reducing frustration, and optimizing collaboration. Even more particularly, by optimizing virtual collaboration, the proposed techniques allow users to be constantly virtually engaged in their workplace at a greatly reduced rate of transmission by reducing the number of transmissions collaborators need to send to each other to achieve the same level of cohesion and idea production, thereby saving computational resources (e.g., processor usage, memory usage, network bandwidth, etc.).

With reference now to the Figures, example embodiments of the present disclosure will be discussed in further detail.

Example Devices and Systems

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, or any other computer device that is configured such that it can allow a user to participate in a video conference. The client computing device 102 can include one or more processor(s) 112, memory 114, an associated display device 120, a video conferencing application 122, and a camera 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing system 130 (e.g., one or more video conferencing applications 122, etc.). The client computing device 102 can implement the instructions to execute aspects of the present disclosure, including directing communications with server computing system 130, providing a video conferencing application 122 and/or video stream to a user, processing requests from users for execution of a multi-interaction display, and determining and providing data indicative of the current state of the interaction display.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. The video conferencing application can capture image data from a camera 124 and transmit that data to the server computing system. The client computing device 102 can receive, from the server computing system 130 image data from one or more other participants of the video conference (e.g., other client computing devices 102). The client computing device 102 can then display the received image data to users of the client computing device 102 on associated display device 120. In some example embodiments, the camera 124 collects image data from one or more users. The camera can be any device capable of capturing visual data.

More particularly, the client computing device 102 can receive one or more video streams from the server computing system 130. The client computing device 102 can, as an example, display the received video streams in the associated display device 120 (e.g., a laptop display device, a smartphone display device, a communicatively connected display device, etc.) including a multi-user interaction display. For example, the client computing device 102 can receive a request from a first user at a first client device for execution of a multi-user interaction display within the GUI provided by the video conferencing system. The GUI can include a plurality of displays associated with respective video streams of one or more users. The multi-user interaction display can include computer executable code that is responsive to inputs provided by multiple attendees at respective client devices.

Additionally, or alternatively, in some implementations, the client computing device 102 can generate a video stream and send the video stream to the server computing system 130 (e.g., via network(s) 180). More particularly, the client computing device 102 can capture a video stream using camera 124 (e.g., an integrated webcam, communicatively connected camera device, etc.). The client computing device 102 can encode the captured video (e.g., as specified by instructions 118, etc.).

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) 132 and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive video streams from a plurality of client computing devices 102 (e.g., via network 180) respectively associated with a plurality of video conference attendees. The video conferencing system 140 can provide the video streams to each of the client computing devices 102. Further, the video conferencing system 140 can manage provided stream quality. In some implementations, the video conferencing system 140 can manage provided stream quality by transmitting requests to client computing devices 102 to provide video streams with a certain quality and/or resolution. In such fashion, the server computing system 130 can utilize video conferencing system 140 to facilitate the functionality of the video conferencing applications 122 on each client computing device 102.

It is noted that video conferencing application 122 can be considered part of the video conferencing system 140 in example embodiments. In various examples, video conferencing application 122 and/or video conferencing system 140 can determine a current state of the multi-user interaction display in response to inputs provided by the first user at client computing device 102 as well as inputs from other users at other client devices. The video conferencing application and/or system can provide data for rendering the GUI. The data can include video data associated with one or more attendees for respective displays of the GUI and data indicative of the current state of the multi-user interaction display. The data indicative of the current state can include content data representing the current state or state data allowing other computing devices to retrieve content representing the current state. For example, data 116 and/or 136 may include content data and/or state data in accordance with example embodiments. Content data may provide content that is rendered at the client computing device 102. State data may provide instructions, commands, or other information for the video conferencing application 122 to maintain a current state with other client devices.

Example Model Arrangements

Figure 2:
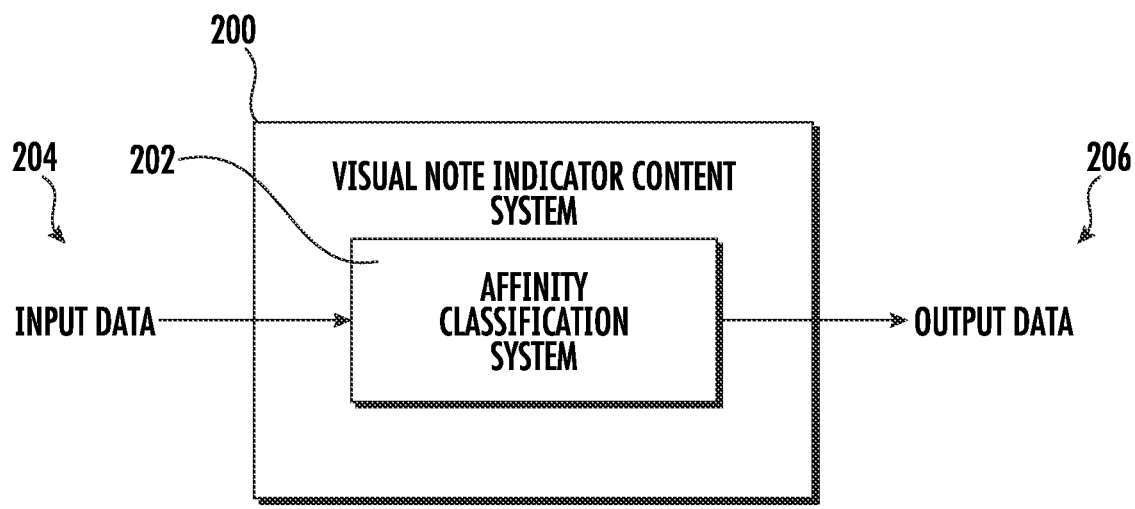
FIG. 2 depicts a representation of example components of a videoconferencing system incorporating machine-learning components according to example embodiments of the present disclosure.

FIG. 2 depicts a block diagram of an example generalized representation model 400 according to example embodiments of the present disclosure. In some implementations, the visual note indicator content system model 200 is trained to receive a set of input data 204 descriptive of raw user data and, as a result of receipt of the input data 204, provide output data 206 that includes an affinity classification presented in the raw user data. Thus, in some implementations, the visual note indicator content system model 200 can include an affinity classification system model 202 that is operable to generate a prediction of what affinity classification is associated with the content of the visual note indicator.

In particular, affinity classification system model 202 can leverage the input data 204 to determine an affinity classification of a user based on input data 204. For instance, the affinity classification system model 202 can predict the affinity classification of a user based on the input data 204.

In some implementations, the affinity classification system model 202 can be a machine-learned image classification model. For example, the machine-learned image classification model can be used to detect the affinity classification of the user (e.g., by leveraging features such as semantic analysis (discriminative, generative, cognitive, etc.) by training on historical user data. As another example, the machine-learned image classification model can be used to detect the affinity classification of the user by training on data generalized from a plurality of users. As one example, a machine-learned image classification model can be trained to classify an image input by a user into one or more of a plurality of different classes which respectively correspond to a plurality of different affinity classifications. As one example, the classification model can be trained using a supervised learning approach on a training dataset that includes a plurality of training data pairs. Each pair of training data can include an image of a person or scene and a ground truth label that indicates a ground truth semantic status of the person or scene. For example, the machine-learned image classification model can be used to detect the affinity classification of the visual note indicator (e.g., identified objects, identified people, etc.) by training on historical user data. As another example, the machine-learned image classification model can be used to detect the affinity classification of the user by training on data generalized from a plurality of users.

In some implementations, the affinity classification system model 202 can be a machine-learned textual classification model. For example, the machine-learned textual classification model can be used to detect the affinity classification of the user (e.g., by leveraging features such as textual analysis (Naive Bayes, support vector machines, deep learning, etc.)) by training on historical user data. As another example, the machine-learned textual classification model can be used to detect the affinity classification of the user by training on data generalized from a plurality of users. As one example, a machine-learned textual classification model can be trained to classify text input by a user into one or more of a plurality of different classes which respectively correspond to a plurality of different affinity classifications much like the machine-learned image classification model described above.

The visual note indicator content system model 200 can leverage the output of the affinity classification system model 202 to generate an affinity classification of the visual note (e.g., the content contained in the visual note). Even more particularly, the visual note indicator content system model 200 can leverage the input data 204 in combination with the output of the affinity classification system model 202 to generate the output data 206 which could include the representation of an affinity classification (e.g., visual note content subject) associated with the visual note indicator.

In some implementations, the visual note indicator content system model 200 can include a machine-learned image generation model can include machine-learned encoder and decoder models. The machine-learned encoder and decoder models can be used to generate the generalized representation of the user. For example, the encoder can receive the raw image of the user and/or one or more reference images and encode the image(s) to a latent representation (which can also be referred to as a neural representation) that describes the subject depicted in the image(s). The decoder can expand the latent representation to a generalized identification of the subject matter contained in the image.

In some implementations, the encoder model and the decoder model can each be convolutional neural networks. In some implementations, the encoder model and the decoder model can be stored and run on the same device while in other implementations the encoder model and the decoder model can be stored and run on separate devices (e.g., a sender and a receiver device). In some implementations, the encoder model is the same as the affinity classification system model 202 while in other implementations they are different models. Thus, various combinations of model(s) can be used to determine the semantic status of a user and to generate a generalized video representation of the user that depicts the semantic status.

Example Applications

Figure 3:
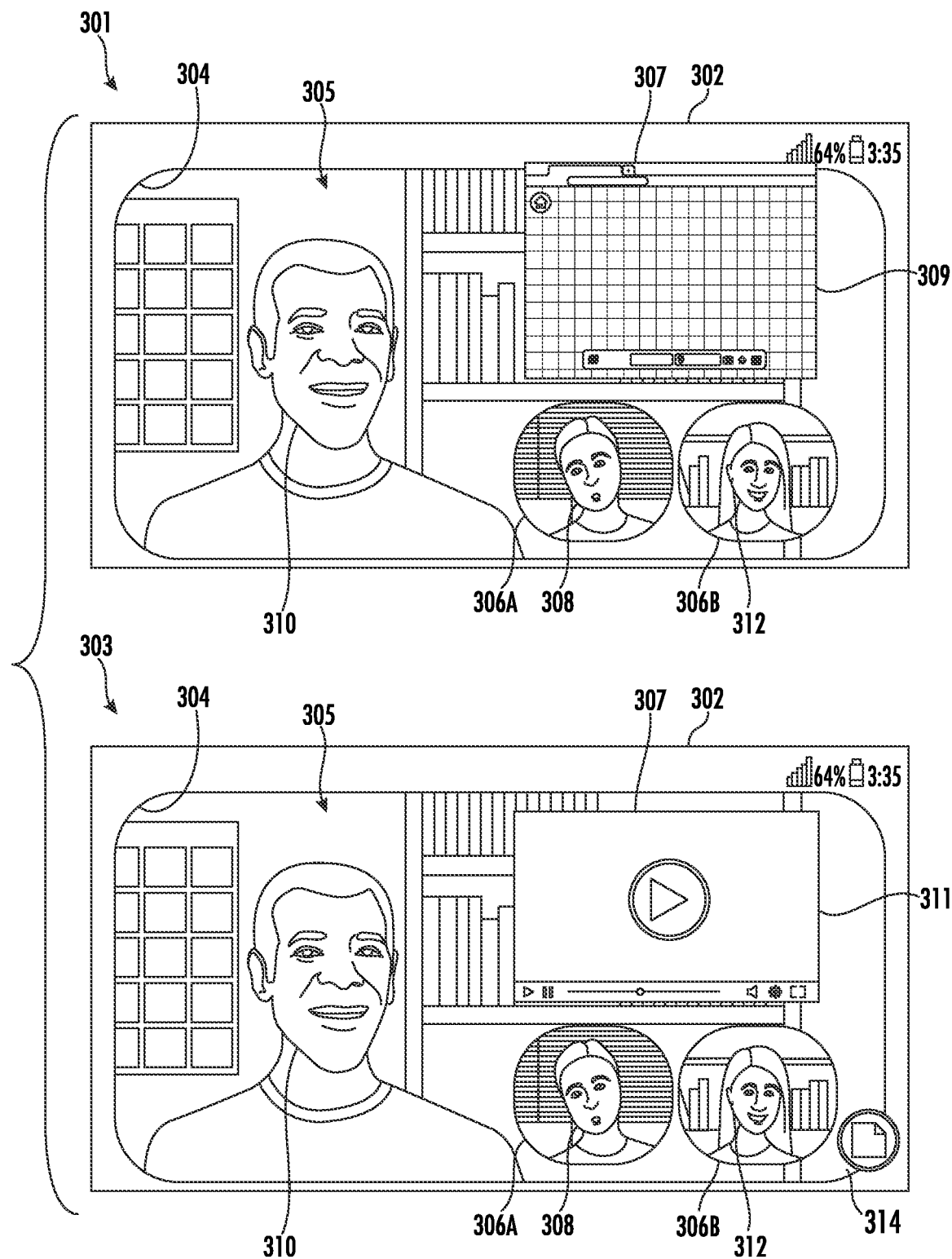
FIG. 3 depicts an example graphical user interfaces of a multi-attendee video conferencing system including a multi-user interaction whiteboard according to example embodiments of the present disclosure.

FIG. 3 depicts an example graphical user interface of a multi-attendee video conferencing application 122 and video conferencing system 140 according to example embodiments of the present disclosure. As shown at 301, client device 302 (e.g., a smartphone, tablet, laptop computer, etc.) can display a video stream of a first attendee 310 in a primary display region of GUI 305. In some examples, the speaking role of the first attendee 310 can be a dominant speaking role (e.g., the attendee that is currently speaking, etc.) and based on the dominant speaking role of the first attendee 310, the client device 302 can display the video stream of the first attendee 310 in primary display 304.

Although the primary display 304 is depicted as using the entirety of the display of client device 302, it should be noted that the primary display 304 does not necessarily need to do so. As an example, the primary display 304 may use 80% of the available display of the client device 302.

The client device 302 can display a video stream for a second attendee 308 and a video stream for a third attendee 312 in video displays 306A and 306B. For example, the speaking roles of second attendee 308 and third attendee 312 can be non-dominant speaking roles (e.g., the attendees that are not currently speaking, etc.). Based on the non-dominant speaking roles of the second attendee 308 and the third attendee 312, the client device 302 can display the video streams of the second attendee 308 and the third attendee 312 respectively in the video displays 306A and 306B. Additionally, or alternatively, it should be noted that the video displays 306A and 306B do not necessarily need to be overlaid on the primary display 304. In some implementations, the video displays 306A and 306B can instead be displayed adjacent to the primary display 304. Additionally, or alternatively, it should be noted that the video displays 306A and 306B do not necessarily need to be smaller in size than the display associated with the dominant speaking role. In some implementations, all video displays can be of equal sizing. Additionally, three video displays are provided by way of example only. A multi-attendee videoconference may include any number of displays and associated video streams.

As shown at 301, graphical user interface (GUI) 305 includes an interaction display 307 in which a software application can be executed that is responsive to inputs from multiple attendees of the video conference. In this example, the interaction display 307 hosts a multi-user white board application 309 which can execute in association with the multi-user interaction display. The multi-user white board application can respond and change in real-time as multiple attendees of the video conference interact with the interaction display. For example, video conference attendees can annotate the multi-user white board. For instance, attendees of the video conference can annotate content displayed within the interaction display using text comment boxes, shape tools, free-form inking (e.g., mouse and pen) and select the color of their annotations. In this manner, an improved collaborative experience can be provided by enabling multiple users to engage with content.

At 303, GUI 305 is depicted with an interaction display 307 hosting a user screen sharing presentation 311. For example, the user screen sharing presentation 311 can show a video player application. As another example, the user screen sharing presentation 311 can show a slideshow, web browser, document, or any other content a user shares. At 303, GUI 305 is depicted with a multi-user whiteboard icon 314. For example, a user can interact with the multi-user whiteboard icon 314 to initiate the multi-user whiteboard. For instance, initiating the multi-user whiteboard can include displaying the multi-user whiteboard in a display to one or more video conference attendees such that multiple users can be enabled to engage with the multi-user whiteboard. As another example, initiating the multi-user whiteboard can include displaying the multi-user whiteboard in a display to one or more video conference attendees such that the multi-user whiteboard is translucently overlaying on top of the user screen sharing presentation 311. For instance, the multi-user whiteboard can be translucently overlayed on top of the user screen sharing presentation 311 such that the one or more video conference attendees can see content a user is sharing (e.g., a slideshow, web browser, document, etc.) underneath the multi-user whiteboard (e.g., in real time). A user can further interact with the multi-user whiteboard icon 314 to minimize the multi-user white board application 309.

Figure 4:
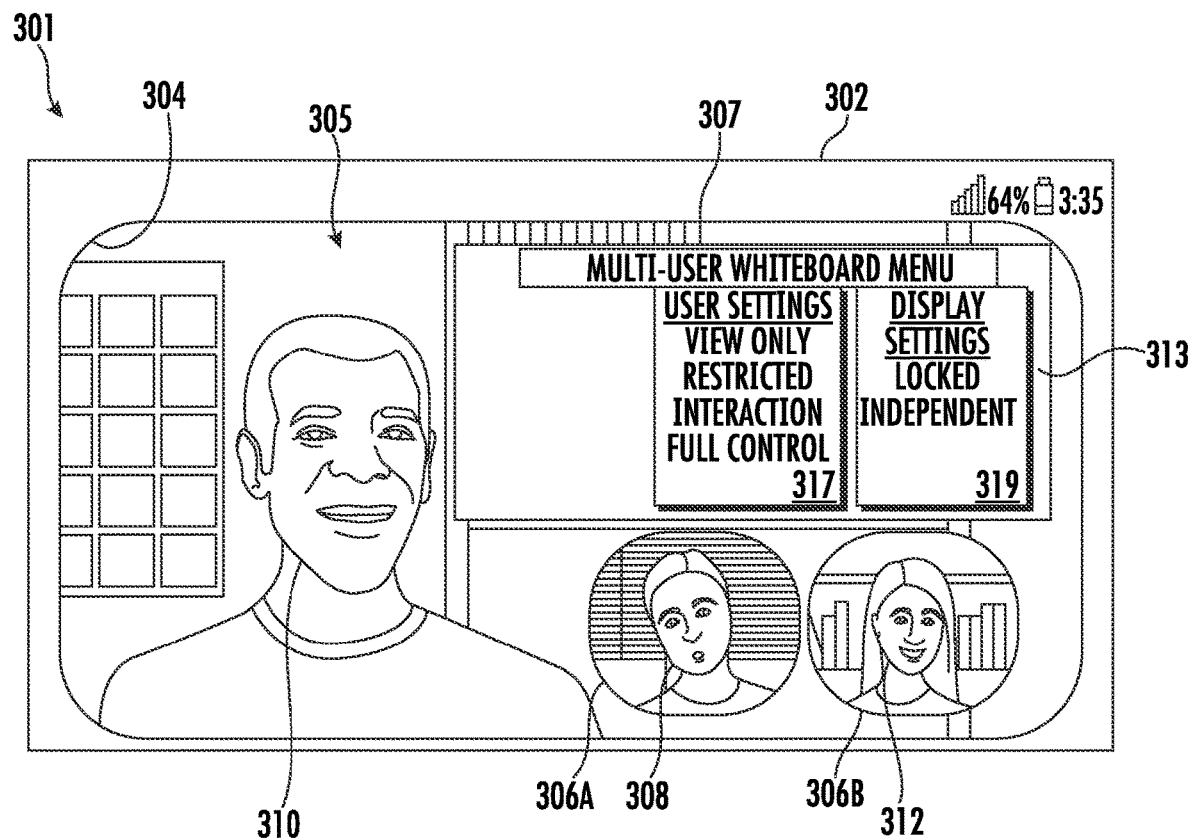
FIG. 4 depicts another example graphical user interfaces of a multi-attendee video conferencing system including settings for a multi-user interaction whiteboard according to example embodiments of the present disclosure.

FIG. 4 depicts an example graphical user interface 305 of a multi-attendee video conferencing application 122 provided by video conferencing system 140 according to example embodiments of the present disclosure. As depicted in FIG. 4, the video conferencing system can further provide the ability for an attendee to control interaction through user and display settings or permissions for interaction with a multi-user interaction display by other attendees of the video conference. The video conferencing system can enable one or more attendees to manage a multi-user interaction display for a shared video conference. GUI 305 includes configuration menu 313 which enables an attendee (e.g., attendee 310) to launch and select settings for interaction display 307. In response to launching or otherwise initiating the interaction display 307, the video conferencing system may present configuration menu 313. Configuration menu 313 may include one or more user settings and/or display settings that allow a multi-user interaction display to be customized for a video conference. User settings may enable particular users to be granted a particular set of permissions with respect to the interaction display while display settings may enable the display of content for the interaction display to be managed for individual client devices.

By way of example, a first attendee 310 can create or otherwise instantiate a multi-user white board application 309 for a video conference. Attendee 310 may be referred to as a creator in some examples. In response to the first attendee 310 initiating the multi-user white board application 309, the GUI can display to the first attendee various user or display settings in configuration menu 313.

A first setting menu 317 includes user settings that can enable the first attendee to select or otherwise define which attendees are able to view, edit, or otherwise interact with the multi-user white board application 309 to affect the display of content. In this particular example, the user settings include a view only setting, a restricted interaction setting, and a full control setting. In some examples, a first user can be granted different (e.g., more or fewer) permissions than a second user. The first user may be granted view and full edit permissions while the second user may only be granted view permissions and limited editing permissions. The permissions granted to a user can be changed.

A second setting menu 319 includes display settings that enable the first attendee to control the display of content within the multi-user white board application 309 at various client devices. For example, the attendee can lock the display of the interaction display at particular client devices or can enable the client devices to independently control the display of content. A locked view provides a consistent view of the interaction display at each client device. An individual view permits each user and/or client device to have an independently controllable view of the multi-user white board application 309. This independent view can enable each attendee to scroll, resize, zoom, or otherwise define the display of content as they individually would like.

Additionally, or alternatively, each user can have a different view depending on their screen (e.g., size and/or resolution).

Additionally, the interaction display may enable screenshots and exports. For example, attendees can be permitted to capture select portions of the displayed content or the entire content associated with an interaction display. The selected portion can be exported along with other meeting artifacts. For example, a log of all user interactions with the interaction display including user inputs to the executable code and annotations can be maintained by the video conferencing system, thereby enabling attendees to playback the multi-user white board application 309 interactions through the video conference.

Additionally, the interaction display can be associated with the particular video conference such that a user can access the annotated interaction display by entering the associated video conference (e.g., by associated URL, calendar invite, etc.).

Figure 5:
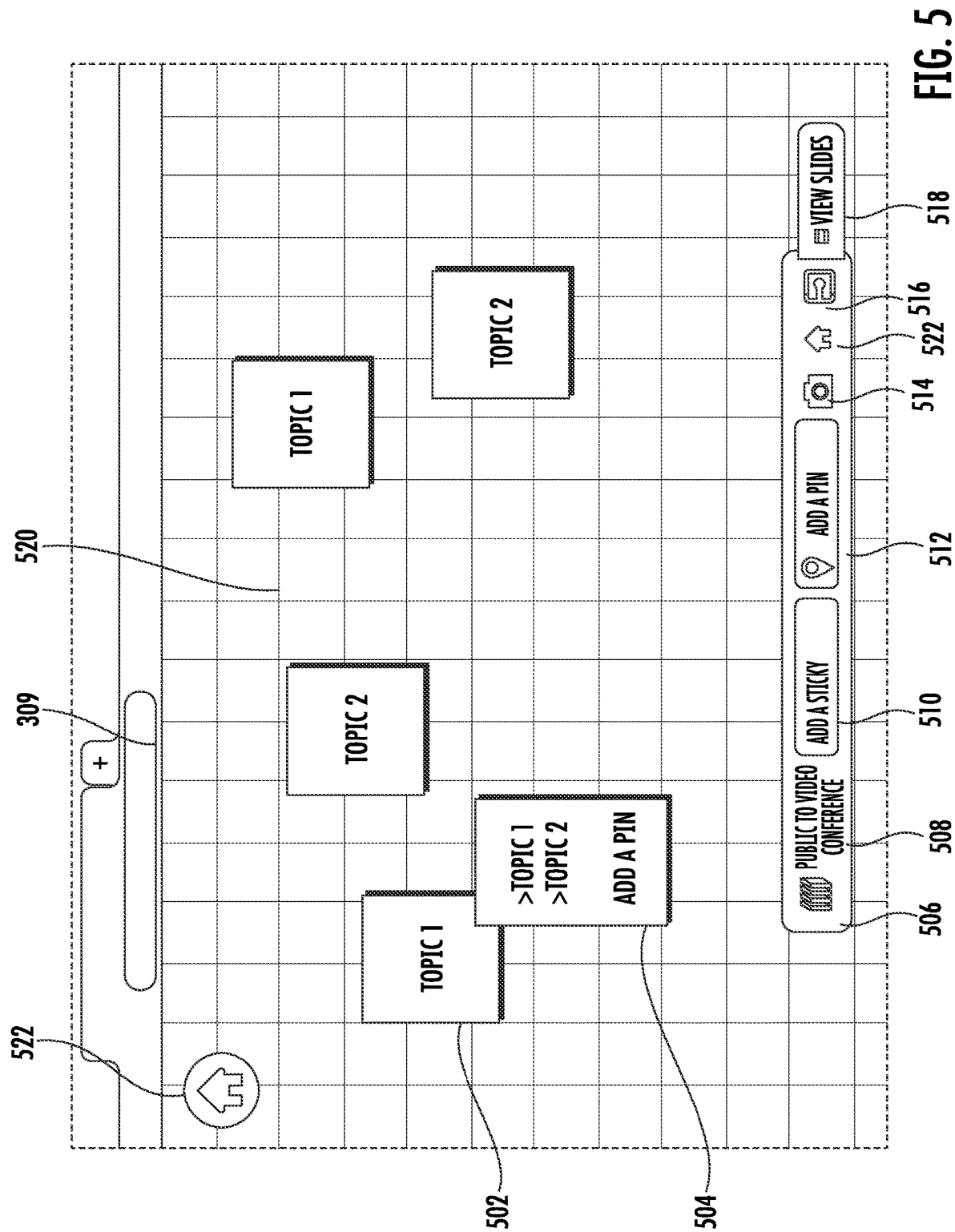
FIG. 5 depicts another example graphical user interface of a multi-user interaction whiteboard according to example embodiments of the present disclosure.

FIG. 5 illustrates an exemplary implementation of the multi-user white board application 309. 309 shows an exemplary implementation of a multi-user white board application 309 wherein the multi-user white board application can be acted upon by more than one participant. In some implementations, a visual note indicator 502 can be overlayed on the multi-user white board application 309 interface. As one example, the visual note indicator 502 can look like a note used in conventional brainstorming sessions in person (e.g., a sticky note). In particular, the content in the visual note indicator 502 can be handwritten or typed.

In some implementations, a context menu 504 can be initiated by user input (e.g., right clicking). For example, the context menu 504 can be associated with a particular visual note indicator 502. For instance, the context menu 504 can be associated with the particular visual note indicator 502 by proximity between the user input initiating the context menu 504 and the particular visual note indicator 502. In particular, the context menu 504 can have one or more selectable interface buttons. For example, the one or more selectable interface buttons can include affinity classifications (e.g., that the user has previously indicated, the computing system has automatically detected, etc.). As another example, the one or more selectable interface buttons can include an interface wherein a user can add another affinity classification (e.g., by typing, pasting, linking, etc.). For instance, if a user adds another affinity classification in a context menu 504 associated with a particular visual note indicator 502, the particular visual note indicator 502 can be automatically associated with the added affinity classification.

In some implementations, a tool bar 506 can be overlayed on top of the multi-user white board application 309 interface. In some implementations, a label 508 located on the tool bar 506 or elsewhere can indicate the degree of accessibility of the multi-user white board application 309. For example, the label 508 can indicate that the multi-user white board application 309 is private if it is restricted in accessibility to a single user. Additionally, the label 508 can indicate that the multi-user white board application 309 is public and to whom it is public to (e.g., video conference participants). Even more so, the label 508 can indicate that the multi-user white board application 309 is selectively accessible and in some cases indicate to whom it is accessible.

In some implementations, a visual note indicator initiator 510 can be contained in the tool bar 506 or elsewhere. For instance, the visual note indicator initiator 510 can be used to initiate a visual note indicator 502. In particular, a user can insert content (e.g., type, paste, link, etc.) directly into the visual note indicator 502 such that the visual note indicator 502 initiated contains the content inserted in the visual note indicator initiator 510.

In some implementations, an affinity classification initiator 512 can be contained in the tool bar 506 or elsewhere. For instance, the affinity classification initiator 512 can be used to initiate an affinity classification. In particular, the affinity classification can be unaffiliated with any particular visual note indicators 502. Conversely, when initiating the affinity classification, the user can indicate visual note indicators 502 as being associated with the affinity classification. Alternatively, the visual note indicators 502 can be automatically associated with the initiated affinity classification based on computing system analysis of content presented in the visual note indicators 502.

In some implementations, a camera tool 514 can be contained in the tool bar 506 or elsewhere. For instance, the user can interact with the camera tool 514 interface to initiate a camera. In particular, a user can take a picture using the camera and post the picture on the multi-user white board application 309. Even more particularly, a user can use the camera to capture images of notations a user has created in real life. The computing system can leverage the images of notations and process the images to create representations of the notations to post on the multi-user white board application 309. Conversely, the camera tool 514 can cause a QR code to appear such that a user can leverage a personal device containing a camera (e.g., cellphone, tablet, laptop, etc.) to scan the QR code and upload images captured on their personal device.

In some implementations, a slide exportation tool 516 can be contained in the tool bar 506 or elsewhere. For instance, the user can interact with the slide exportation tool 516 interface by clicking or hovering over the slide exportation tool 516 interface. The slide exportation tool 516 can provide a user with different results depending on how the user interacts with the slide exportation tool 516. For example, although not necessarily, the user can hover over the slide exportation tool 516 interface to view another view slides tool 518. The view slides tool 518 can be further interacted with (e.g., clicked) to initiate a slide preview. For example, a user can preview what slides exported directly from the multi-user white board application 309 would look like without actually exporting the multi-user white board application 309 to a slide deck (e.g., to save storage). The user can interact with the original slide exportation tool 516 interface (e.g., click) to export the multi-user white board application 309 interface to a slide deck. The slide deck can use the grid lines 520 contained in the multi-user white board application 309 to guide what content is grouped in slides together. Furthermore, the grid lines 520 can indicate the order of presentation of a slide deck (e.g., top to bottom, left to right).

In some implementations, a home tool 522 can be contained in the tool bar 506 or elsewhere. For instance, the user can interact with the home tool 522 to move the viewpoint of the multi-user white board application 309 to the center of the multi-user white board application 309. For example, as one or more users add more and more visual note indicators 502 users may move the multi-user white board application 309 around. If the user desires to return to where they started, they can interact with the home tool 522 and center themselves.

Figure 6:
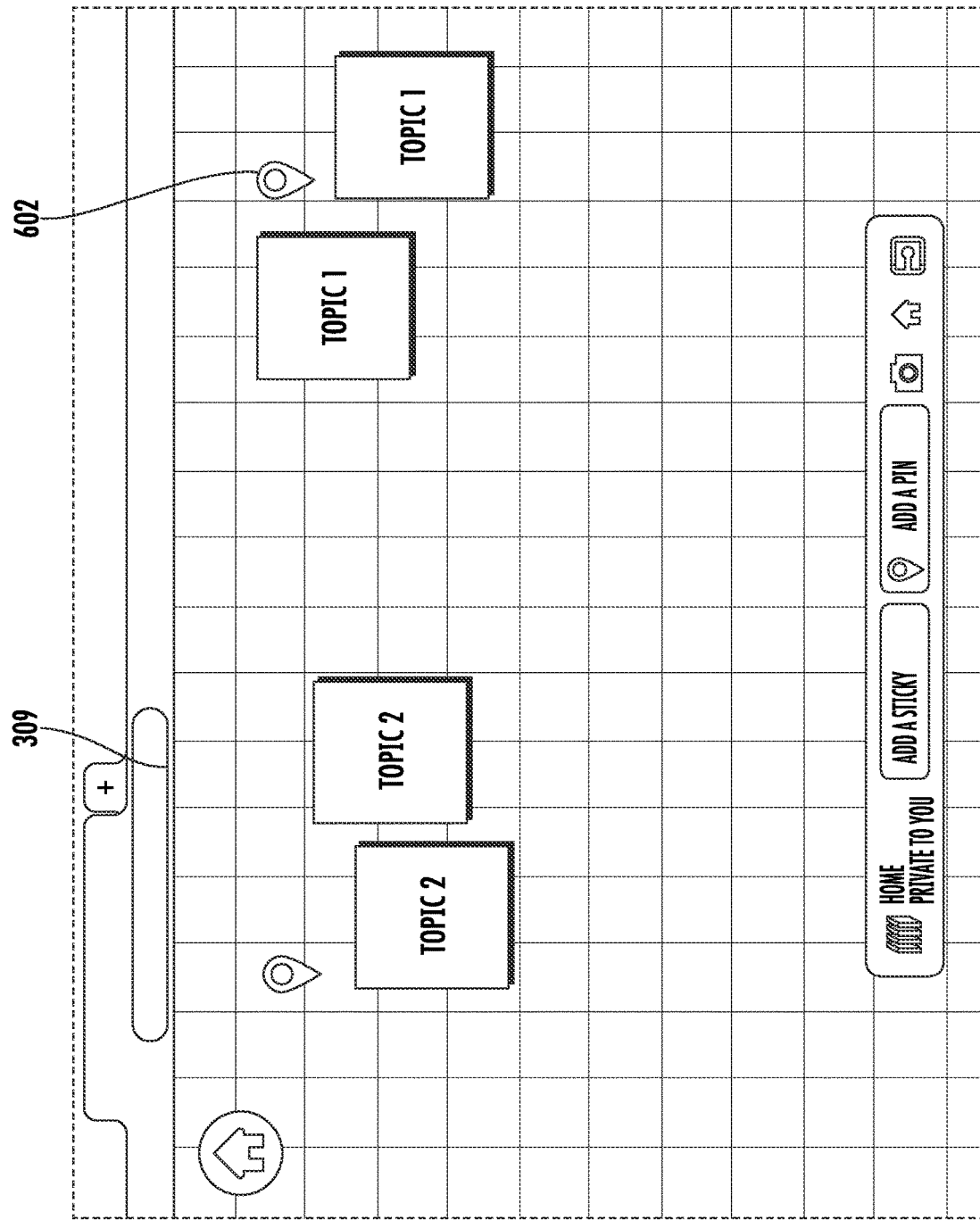
FIG. 6 depicts another example graphical user interface of a multi-user interaction whiteboard according to example embodiments of the present disclosure.

FIG. 6 illustrates another exemplary implementation of the multi-user white board application 309. 309 shows an exemplary implementation of a multi-user white board application 309 wherein the multi-user white board application can be acted upon by more than one participant. The affinity classification can be associated with a location of the multi-user white board application 309. In particular, the location of a particular affinity classification on the multi-user white board application 309 can be indicated by an affinity classification icon 602 (e.g., a pin, circle, etc.). Even more particularly, the visual note indicators 502 associated with the particular affinity classification associated with the particular affinity classification icon 602 can be placed in proximity to the particular affinity classification icon 602. For example, the visual note indicators 502 can be associated with a particular affinity classification in part due to user input. As another example, the visual note indicators 502 can be associated with a particular affinity classification in part due to automatic computing system classification. As yet another example, the visual note indicator 502 can be associated with more than one affinity classification.

Example Methods

Figure 7:
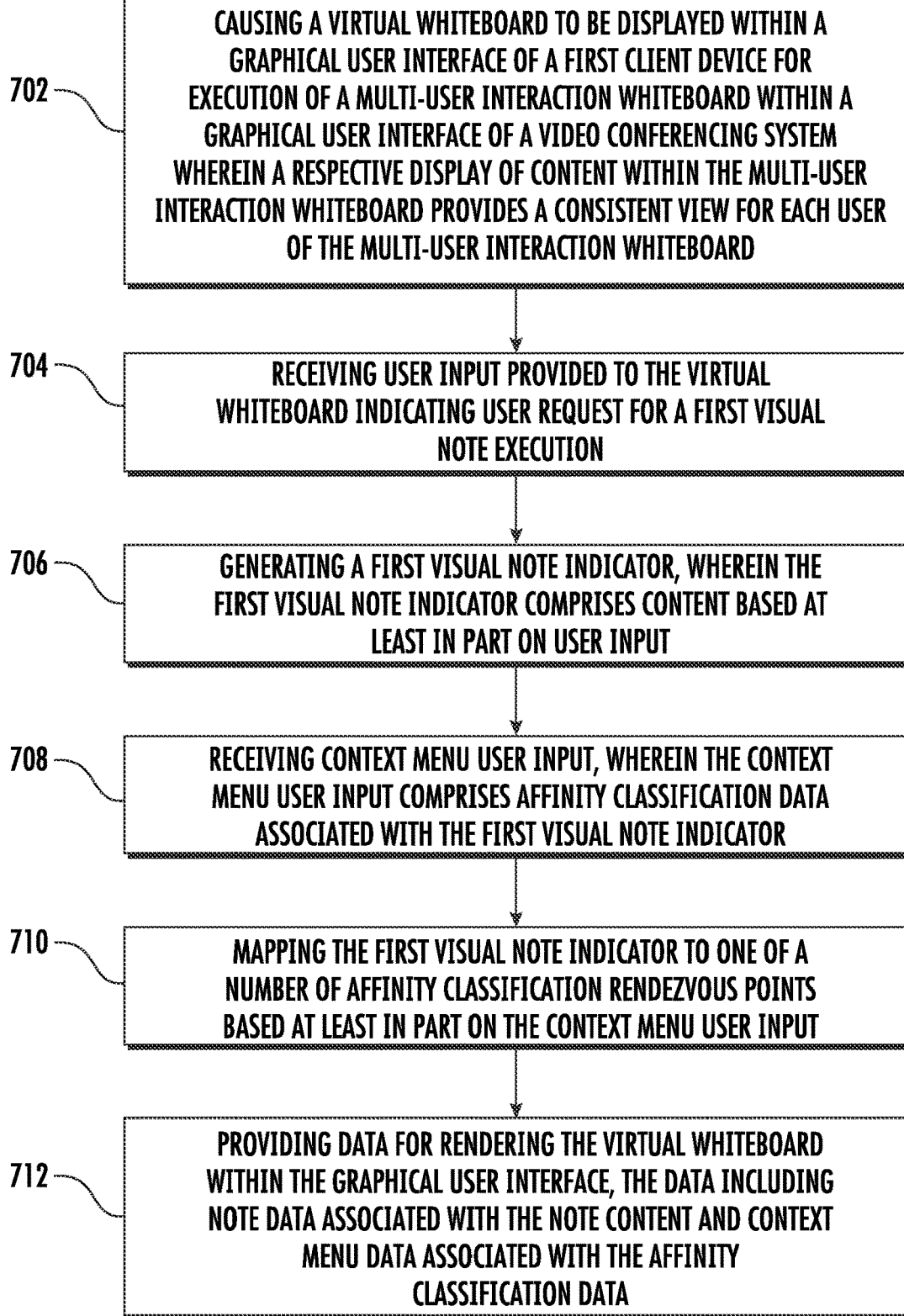
FIG. 7 depicts a flow diagram for providing a multi-attendee video conference including a multi-user interaction whiteboard according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can cause a virtual whiteboard to be displayed within a graphical user interface of a first client device. In particular, the graphical user interface of the first client device can execute a multi-user interaction whiteboard within a graphical user interface of a video conferencing system. Even more particularly, a respective display of content within the multi-user interaction whiteboard can provide a consistent view for each user of the multi-user interaction whiteboard.

At 704, the computing system can receive user input. In particular, the user input can be provided to the virtual whiteboard indicating user request for a first visual note execution.

At 706, the computing system can generate a first visual note indicator. In particular, the first visual note indicator can comprise content based at least in part on user input.

At 708, the computing system can receive context menu user input. In particular, the context menu user input can comprise affinity classification data associated with the first visual note indicator.

At 710, the computing system can map the first visual note indicator. In particular, the first visual note indicator can be mapped to one of a number of affinity classification rendezvous points. Even more particularly, the first visual note indicator can be mapped to one of a number of affinity classification rendezvous points based at least in part on the context menu user input.

At 712, the computing system can provide data for rendering the virtual whiteboard. In particular, the virtual whiteboard can be rendered within the graphical user interface. Even more particularly the data can include note data associated with the note content and context menu data associated with the affinity classification data.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for organizing visual note indicators associated with an affinity classification within a virtual whiteboard user interface, the method comprising:
    causing, by a computing system comprising one or more computing devices, a virtual whiteboard to be displayed within a graphical user interface of a first client device for execution of a multi-user interaction whiteboard within a graphical user interface of a video conferencing system wherein a respective display of content within the multi-user interaction whiteboard provides a consistent view for each user of the multi-user interaction whiteboard;

receiving, by the computing system, user input provided to the virtual whiteboard indicating user request for a first visual note execution;

generating, by the computing system, a first visual note indicator, wherein the first visual note indicator comprises visual note content based at least in part on user input;

receiving, by the computing system, context menu user input, wherein the context menu user input comprises affinity classification data associated with the first visual note indicator;

mapping, by the computing system, the first visual note indicator to one of a number of affinity classification rendezvous points based at least in part on the context menu user input, wherein mapping the first visual note indicator comprises moving the first visual note indicator within the virtual whiteboard to a location associated with the affinity classification rendezvous points;

providing, by the computing system, data for rendering the virtual whiteboard within the graphical user interface, the data including note data associated with the visual note content and context menu data associated with the affinity classification data.

2. The computer-implemented method of claim 1, wherein:
the virtual whiteboard is associated with a primary user.

3. The computer-implemented method of claim 2, wherein the method further comprises:
receiving data associated with one or more inputs from the primary user indicating permissions for a secondary user with respect to the multi-user interaction whiteboard.

4. The computer-implemented method of claim 3, wherein:
the permissions of the secondary user are fewer than permissions of the primary user.

5. The computer-implemented method of claim 2, wherein:
the primary user is a user associated with organizing a video conference leveraging the video conferencing system.

6. The computer-implemented method of claim 1, wherein:
the multi-user interaction whiteboard is generated as a translucent overlay within the graphical user interface of the video conferencing system.

7. The computer-implemented method of claim 1, wherein:
the virtual whiteboard comprises single slides-sized rectangles in the graphical user interface wherein the virtual whiteboard is converted to a presentation including slides comprising content grouped by the single slides-sized rectangles in the graphical user interface.

8. The computer-implemented method of claim 1, wherein:
the multi-user interaction whiteboard is generated automatically upon initialization of a video conference leveraging the video conferencing system.

9. The computer-implemented method of claim 1, wherein:
the multi-user interaction whiteboard is generated separately from a private user whiteboard, wherein the private user whiteboard is inaccessible to any users other than an associated primary user.

10. A computing system, comprising:
one or more processors; and
one or more non-transitory, computer-readable media that store instructions that, when executed by the one or more processors cause the computing system to perform operations, the operations comprising:
causing a virtual whiteboard to be displayed within a graphical user interface of a first client device for execution of a multi-user interaction whiteboard within a graphical user interface of a video conferencing system wherein a respective display of content within the multi-user interaction whiteboard provides a consistent view for each user of the multi-user interaction whiteboard;

receiving user input provided to the virtual whiteboard indicating user request for a first visual note execution;

generating a first visual note indicator, wherein the first visual note indicator comprises visual note content based at least in part on user input;

receiving context menu user input, wherein the context menu user input comprises affinity classification data associated with the first visual note indicator;

mapping the first visual note indicator to one of a number of affinity classification rendezvous points based at least in part on the context menu user input, wherein mapping the first visual note indicator comprises moving the first visual note indicator within the virtual whiteboard to a location associated with the affinity classification rendezvous points;

providing data for rendering the virtual whiteboard within the graphical user interface, the data including note data associated with the visual note content and context menu data associated with the affinity classification data.

11. The computing system of claim 10, wherein:
the virtual whiteboard is associated with a primary user.

12. The computing system of claim 11, wherein the operations further comprise:
receiving data associated with one or more inputs from the primary user indicating permissions for a secondary user with respect to the multi-user interaction whiteboard.

13. The computing system of claim 12, wherein:
the permissions of the secondary user are fewer than permissions of the primary user.

14. One or more non-transitory computer-readable media that store instructions that, when executed by one or more processors of a computing system, cause the computing system to perform operations comprising:
causing a virtual whiteboard to be displayed within a graphical user interface of a first client device for execution of a multi-user interaction whiteboard within a graphical user interface of a video conferencing system wherein a respective display of content within the multi-user interaction whiteboard provides a consistent view for each user of the multi-user interaction whiteboard;

receiving user input provided to the virtual whiteboard indicating user request for a first visual note execution;

generating a first visual note indicator, wherein the first visual note indicator comprises visual note content based at least in part on user input;

receiving context menu user input, wherein the context menu user input comprises affinity classification data associated with the first visual note indicator;

mapping the first visual note indicator to one of a number of affinity classification rendezvous points based at least in part on the context menu user input, wherein mapping the first visual note indicator comprises moving the first visual note indicator within the virtual whiteboard to a location associated with the affinity classification rendezvous points;

providing data for rendering the virtual whiteboard within the graphical user interface, the data including note data associated with the visual note content and context menu data associated with the affinity classification data.

15. The one or more non-transitory computer-readable media of claim 14, wherein:

the virtual whiteboard is associated with a primary user.

16. The one or more non-transitory computer-readable media of claim 15, wherein the operations further comprise:

receiving data associated with one or more inputs from the primary user indicating permissions for a secondary user with respect to the multi-user interaction whiteboard.

17. The one or more non-transitory computer-readable media of claim 16, wherein:

the permissions of the secondary user are fewer than permissions of the primary user.

* * * * *